Aug. 1, 1967

M. W. SHAFFER 3,334,230

NUCLEAR GAUGE STANDARDIZATION

Filed Oct. 28, 1963

INVENTOR
MELVIN W. SHAFFER

BY William T. Fryer III

ATTORNEY

INVENTOR
MELVIN W. SHAFFER
BY William T. Fryer III
ATTORNEY

United States Patent Office 3,334,230
Patented Aug. 1, 1967

3,334,230
NUCLEAR GAUGE STANDARDIZATION
Melvin W. Shaffer, Columbus, Ohio, assignor to Industrial Nucleonics Corporation, a corporation of Ohio
Filed Oct. 28, 1963, Ser. No. 319,321
11 Claims. (Cl. 250—83.3)

This invention relates to measuring systems that utilize nuclear radiation as the sensing means and, more particular to the improvement of the standardization of a nuclear radiation gauge.

Standardization is a familiar term applied to the process of adjusting certain components of the gauge so as to restore or maintain its ability to reproduce the readings for which it was calibrated without requiring any repetition of any part of the calibration procedure. A standardization system for a transmission gauge is fully described in U.S. Patents 2,829,268 and 2,790,945 to H. R. Chope. U.S. Patents 2,884,530 to George B. Foster and 2,951,161 to George B. Foster et al. illustrate apparatus and methods for standardization of a backscatter gauge.

The transmission gauge measuring system, which comprises a nuclear source and detector on opposite sides of the material to be inspected, is usually standardized off-sheet. The system is zero-standardized by balancing out all input signals and then source standardization takes place to adjust for changes in nuclear source activity. The backscatter gauge, which comprises a nuclear source and a detector positioned to receive the backscatter radiation from the material to be inspected, is preferably standardized off-sheet over a standardizing member that approaches the reflectivity of the backing material supporting the measured material.

In the use of the transmission and backscatter gauges it is important to compensate for or eliminate any variations, other than in the material under inspection, that affect the gauge indication. Undesirable variations can be due to changes in the air column between the nuclear source detector (hereinafter called the air gap). A change in air gap temperature alters the radiation absorbed by the air. It is common practice to either correct the gauge output signal in response to temperature variation, by sensing the air gap temperature and developing a correction signal, or to condition the air gap by blowing air continuously therethrough to eliminate temperature fluctuations.

Even with the improved accuracy resulting from the abovementioned air gap compensation or condition, error still is present. The present invention locates a significant cause of the error in standardization processes. The off-sheet air gap temperature is not the same as the on-sheet air gap temperature, principally due to the material temperature which sometimes is as high as 200 degrees F. The off-sheet temperature is more or less at ambient temperature. The ambient temperature can vary day-by-day and seasonally at the off-sheet standardization position. Standardization can, and does, take place at different temperatures without proper compensation for temperature variations.

The present invention has for its object to improve the accuracy of a nuclear gauge.

A further object of the present invention is to provide an improved process and apparatus for standardizing a nuclear gauge.

Another object of the present invention is to minimize the error due to changes in the on-sheet and off-sheet standardization air gaps.

A further object of the present invention is to improve the accuracy of a backscatter gauge.

Another object of the present invention is to provide a method and apparatus for standardizing a backscatter gauge over an off-sheet standardization member to minimize errors.

These and other objects of the present invention are achieved by employing my process of adjusting the air temperature at the off-sheet standardization position during the time the gauge is on-sheet to be substantially equal to the gauge on-sheet air gap temperature. A preferred embodiment of one of several apparatuses for performing the above process includes sensors for measuring the on-sheet and off-sheet standardization position air temperatures and means for comparing the temperature and controlling an air conditioning means located at the standardization position to maintain off-sheet air gap temperature substantially equal to the on-sheet air gap temperature. Significant improvement in gauge accuracy can be achieved using the method of my invention.

The present invention is more fully described in the following paragraphs, with reference to the attached figures, wherein, FIG. 1 is an elevational view, partially schematic, showing a backscatter gauge measuring system on a zinc coating line.

Before commencing the detailed description of the present invention as applied to a backscatter gauge, it must be noted that the invention can be utilized on a transmission gauge measuring system. Application of the invention to the backscatter gauge measuring system has several unique features, as will be clearly pointed out hereinafter.

In general, the present invention strikes at the errors caused by standardization of a nuclear gauge off-sheet. The gauge on-sheet air gap temperature can be very high due to high sheet temperature. The gauge moves off-sheet and standardization commences. The off-sheet air temperature in the standardization position fluctuates, partially attributed to the variations in sheet temperature, day-by-day and seasonal variations. These changes prevent the standardization process from becoming a true standard, thereby defeating its main reason for existence.

The solution according to the present invention to the instability of the standardization process is to have the off-sheet air temperature in the standardization position above ambient. While the gauge is on-sheet, heat is supplied to maintain the temperature of the air in the standardization posiiton at substantially the temperature of the on-sheet air gap. The gauge moves to the off-sheet standardization position and the air is at substantially the sheet temperature each time standardization occurs. Error in the gauge reading caused by variations in the on-sheet air gap and standardizing conditions are thereby minimized.

Figure 1:
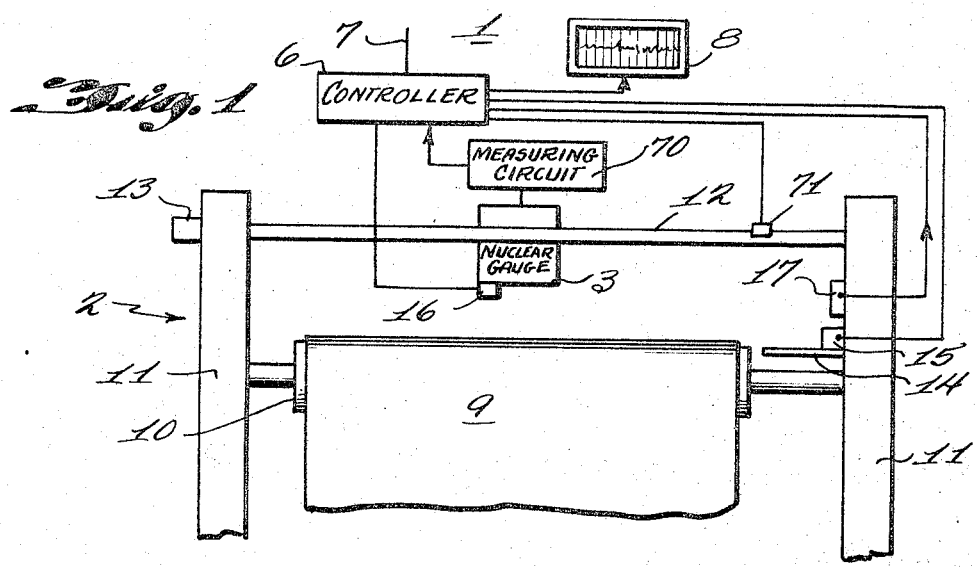

In FIG. 1 the present invention is illustrated as applied to a backscatter gauge measuring system 1 disposed over a zinc coating line 2 to measuring coating thickness. The measuring system 1 can be the same, except for the addition of the present invention, as described in U.S. Patent 2,951,161, for example, comprising a reflection gauge 3 (see FIG. 2) housing a nuclear source 4, such as a beta emitter, and a detector 5 disposed to measure the backscatter radiation. The gauge indication is coupled through a measuring circuit 70 to a controller 6 of conventional arrangement that compares the gauge indication with a target and initiates control action by an appropriate signal at output 7. The measuring circuit 70 comprises a conventional amplifier and reference comparison arrangement and delivers a signal to the controller 6 that is proportional to the difference between the reference, generally termed the target, and the gauge indication. The measuring circuit 70 also provides for the standardization of the gauge, in accordance with conventional practice. The gauge indication is displayed on recorder 8.

Gauge 3 is arranged over a zinc coated sheet 9 that passes over roll 10 which is rotatably mounted in supports 11. Gauge 3 traverses the lateral width of sheet 9, moving on parallel bars 12, driven by a motor 13. A conventional position controller (not shown) cycles the gauge 3 for successive scans of sheet 9, and to an off-sheet standardization position over a standardization member such as plate 14 attached to support 11. As gauge 3 moves into and back from the standardization position, a switch 71 is tripped to control a relay, as will be described in detail further on.

It is apparent that the backscatter gauge 3 can be used on other types of lines for measuring a material characteristic such as hardness, for example. The present invention performs equally as well on any of these lines.

The temperature of sheet 9 is relatively high, as much as 200 degrees F. and can vary. Air temperature at the standardizing position can be ambient and is subject to day-by-day and seasonal fluctuations. To compensate for these changes, the standardization should take place with the standardization air temperature substantially the same as the on-sheet air temperature. In the illustrated embodiment, the air above standardization plate 14 is conditioned by adjusting the air temperature through an air conditioning means 15. The standardization position is increased to be substantially equal to the on-sheet air gap temperature. A continuous regulation of the temperatures is provided by measuring the on-sheet air gap temperature by a sensor 16 and the air temperature at the standardization position by sensor 17. These temperatures are compared in controller 6, as will be described further on, to adjust air conditioner means 15 to maintain the on-sheet air gap temperature substantially equal to the air temperature at the standardization position. Then standardization automatically compensates for a change in the on-sheet air gap temperature and the standardization position temperature.

Figure 2:
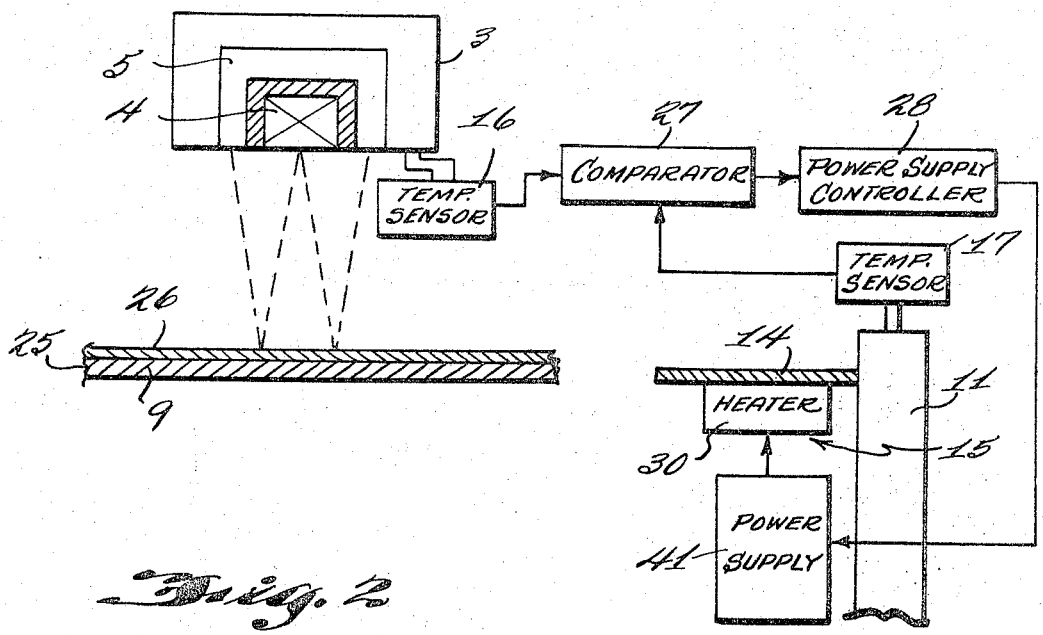
FIG. 2 is an enlarged elevational view showing the backscatter gauge on-sheet, the off-sheet standardization member, and the apparatus for maintaining the air temperatures substantially equal in accordance with the present invention.
Figure 3:
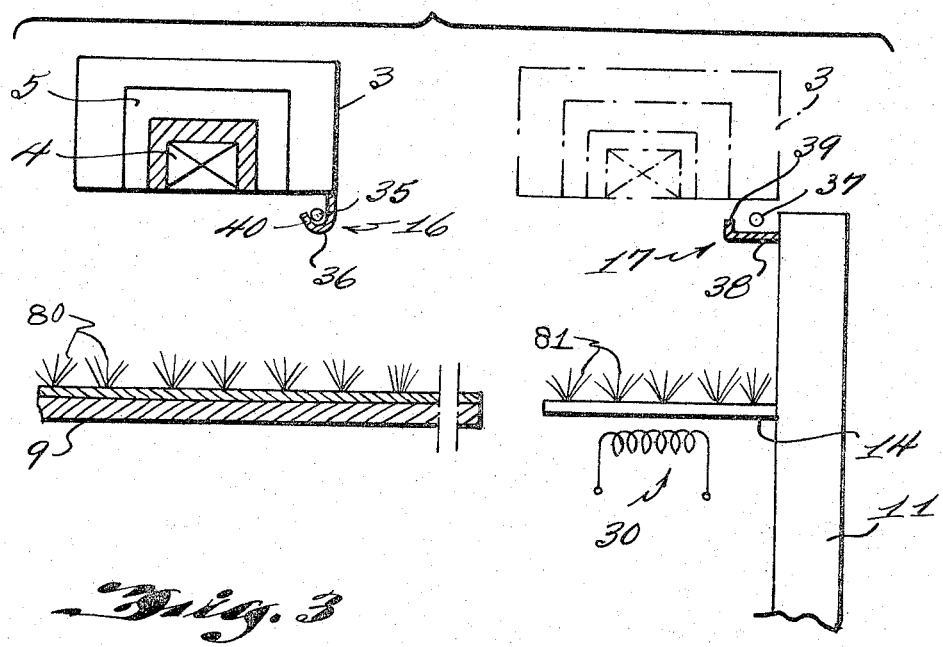
FIG. 3 is an elevational view showing one arrangement of temperature sensors for the apparatus of the present invention.
Figure 4:
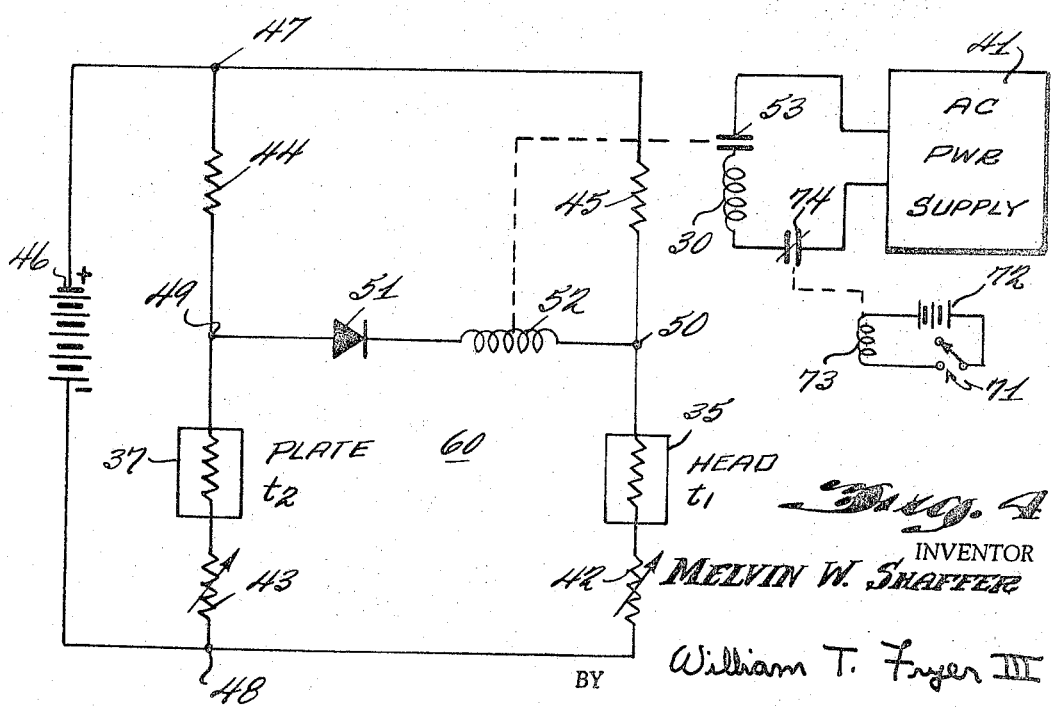
FIG. 4 is one circuit for practicing the method of the present invention.

The portion of controller 6 that regulates the air at standardization position is illustrated in FIGS. 2 through 4. The gauge 3 is shown on-sheet and measuring (FIG. 2). Temperature sensor 16 is supported on gauge 3 and disposed in the on-sheet air gap to measure continuously the air temperature. Temperature sensor 17 is supported on support 11 and disposed over plate 14 to continuously measure the air temperature at the standardization position. Sheet 9 comprising the backing layer 25 and zinc coating 26 may have just passed through a stage that heated the sheets and the sheet temperaure is sensed, in effect, by measuring the air temperature. The signal from temperature sensor 16 is proportional to temperature and is compared in a suitable comparator 27 with the signal proportional to the temperature at the standardization position from sensor 17.

The comparator 27 produces an output signal proportional to the difference between the two siganls, corresponding to the difference in temperatures. The controller output signal actuates a power supply controller 28 that controls the amount of power supplied from power supply 41 to an electric heater 30, functioning as air conditioner means 15, to heat standardization plate 14. As long as the temperature of the on-sheet air gap and the air at the standardization position are substantially equal, heater 30 is not energized. When the temperaure of the on-sheet air gap is greater, then the heater is energized and supplies heat to the plate and air until the temperatures are substantially equal. If the on-sheet air temperature is less than the air temperature at the standardization position, then the heater 30 is not energized. Temperature regulation is preferably cut off when the gauge 3 is in the standardization position. Switch 71 (FIG. 1) deactivates the temperature regulation until gauge 3 moves back on sheet. Since standardization is completed relatively quickly, the air temperature at the standardization position follows very closely the on-sheet air temperature.

A modified arrangement (not shown) operates without the deactivation of the temperature regulating circuit during standardization. The temperature sensor 16 can be mounted fixedly on a non-moving support over the sheet. The gauge 3 can be fixed for single point measurement or can scan the sheet. Temperature sensor 16 then continuously meansures the on-sheet temperature at a location corresponding to the location of temperature sensor 17, to maintain the air temperature at the standardization position substantially the same as the on-sheet air temperature.

Several types of temperature sensors can be used. A preferred type is a thermistor, such as glass-coated beads, since these devices are small, have fast response, high precision and are stable up to 600 degrees F. The thermistors are preferably shielded from direct radiation from the sheet 9 and standardization plate 14, as illustrated in FIG. 3. The thermistor 35 of temperature sensor 16 is supported on and thermally insulated from bracket 36 attached to casing of gauge 3. A refractory material (not shown) can serve to mount thermistor 35. The bracket 36 is curved at its end 40 to shield the thermistor 35 from direct heat radiation 80 of the sheet 9 while still permitting it to be sensitive to the air temperature in the on-sheet air gap. Similarly, the thermistor 37 of temperature sensor 17 is supported by a refractory material (not shown) on a bracket 38 attached to support 11. The bracket 38 has a curved end 39 that shields thermistor 37 from the heat radiation 81 from standardization plate 14 while still allowing measurement of the air temperature at the standardization position. The brackets 36 and 38 transfer the radiant energy produced heat to their supports which act as heat sinks, without significantly affecting the thermistors 37 and 35 respectively.

The thermistors 35 and 37 are located at substantially identical positions in their respective air gaps, as shown in FIG. 3, for example, to sense the temperature at corresponding points. In this way it can be assumed that each of the air gaps has substantially the same temperature variation throughout, and the compensation for air gap temperature is closest to optimum. The brackets 36 and 38 are slightly out of line in a horizontal plane, perpendicular to the drawing sheet as viewed in FIG. 3 for gauge 3 to move to the standardization position without brackets 36 and 38 hitting each other.

The specific circuit of the temperature regulating system may take several forms, following conventional engineering techniques. One simple and effective circuit is shown in FIG. 4, by way of example. The thermistors 35 and 37 which are preferably the same type, are in separate legs of a Wheatstone bridge 60 in series with adjustable resistors 42 and 43 respectively. The other legs of the bridge 60 include equal resistors 44 and 45. The bridge is energized by a DC source 46 connected between the junctions 47 and 48 of resistors 44 and 45 and adjustable resistors 42 and 43 respectively with the indicated polarity. The bridge 60 can be adjusted so that a balanced condition exists at junctions 49 and 50 when the on-sheet air gap temperature equals the air temperature at the standardization position. At this time the potential at junctions 49 and 50 are equal and no current flows through series connected diode 51 and a relatively high resistance relay coil 52 coupled across junctions 49 and 50. When relay coil 52 is energized the normally open switch 53 closes and power is supplied to heater coil 30 from AC power supply 41 through a normally closed contact 74.

Assuming that thermistors selected are of equal resistance and both have a negative temperature coefficient, decrease in resistance with increase in temperature, the bridge 60 will be unbalanced with a greater positive potential at junction 50 when the on-sheet air gap temperature $t_1$ is less than the air temperature at the standardization position. Current will not flow through relay coil 52 due to the polarity of diode 51 and plate 14 will not be heated. When the reverse temperature relationship occurs, i.e., the on-sheet air gap temperature is higher, current will pass through diode 51 and switch 53 will close, heating plate 14 until the temperatures are equal.

The on-sheet air gap temperature and off-sheet standardization air temperature are maintained substantially equal and the measuring system is ready for standardization at all times and temperature changes in the on-sheet air gap and at the standardization position are compensated for each time standardization takes place.

The aforementioned control action takes place while gauge 3 is on sheet and does not occur when gauge 3 is off sheet. Standardization occurs in a relatively short time and the on-sheet and standardization position air temperatures correspond very closely even when regulation is cut off at this time. Deactivation occurs when gauge 3 moves to the standardization position and trips switch 71, closing the circuit from battery 72 to relay coil 73. Power flow to heater 30 is interrupted by normally closed contact 74 which opens when relay 73 is energized. When gauge 3 moves back on sheet, switch 71 istripped and relay 73 is deenergized, closing contact 74 to resume the temperature regulation.

The circuit of FIG. 4 can be rearranged to accommodate thermistors with positive temperature coefficients or a reversal of battery potential. In these cases diode 51 should be reversed to allow current to flow through relay coil 52 only when the on-sheet air gap temperture is greater than the air temperature at the standardization position.

It is apparent to one skilled in the art that the method of the present invention can be practiced by several types of apparatuses, even by hand control, and only one of several suitable apparatuses has been describe. However, the disclosed apparatus has several unique advantages that facilitate the successful implementation of the method. Various changes and modifications to the disclosed apparatus are within the skill of the art, and are to be considered a part of the invention as defined in the appended claims.

I claim:

1. Apparatus for improving the standardization of a nuclear gauge for measuring a sheet characteristic, comprising:
   a nuclear radiation gauge having an air gap between said material and a detector and source to be disposed in an on-sheet position for measurement of a sheet characteristic and to be disposed in an off-sheet position for standarization,
   first means for producing a first signal proportional to temperature in the air gap when the gauge is on-sheet,
   second means for producing a second signal proportional to air temperature in said standardization position,
   means for conditioning the air temperature in said standardization position,
   means for comparing said first and second signals and controlling said conditioning means to maintain the air temperature in said standardization position substantially equal to the air temperature in the on-sheet air gap, and
   means for indicating the output from said gauge and for standardizing said gauge in said off-sheet position.

2. Apparatus, as described in claim 1, wherein:
   said first means comprises a temperature sensitive element disposed adjacent said standardization position, and
   said conditioning means provides heat to the air in said off-sheet position until air temperatures in said on-sheet air gap and in said standardization position are substantially equal.

3. Apparatus, as described in claim 2, wherein:
   said temperature sensitive elements are thermistors connected in a bridge network in said comparing means to produce a third signal proportional to the difference between said first and second signals, said third signal controlling said conditioning means to supply heat to the air adjacent said standardization position,
   said comparing and controlling means being arranged to terminate the supply of heat to the air adjacent said standardization position when said first and second signals are equal.

4. Apparatus for improving the off-sheet standardization of a backscatter gauge comprising:
   a backscatter gauge to be disposed over a sheet to form an on-sheet air gap and to be disposed to an off-sheet position for standardization,
   a standardization member disposed off-sheet for cooperation with said gauge to form an off-sheet air gap,
   a first temperature sensing means disposed in said on-sheet air gap,
   a second temperature sensing means disposed adjacent said standardization member,
   means disposed adjacent said off-sheet air gap to adjust the temperature of the air adjacent said standardization member,
   means coupled to said first and second temperature sensing means for controlling said air temperature adjusting means to maintain the temperature adjacent said standardization member equal to the air temperature in said on-sheet air gap, and
   means indicating the output of said gauge and for stndardizing said gauge on said standardization member.

5. Apparatus, as described in claim 4, wherein:
   said air conditioner comprises a heater thermally coupled to said standardization member and a power supply for energizing said heater to raise the temperature of the air adjacent said standardization member,
   said controlling means varying the power coupled to said heater from said power supply in proportion to the difference in temperatures at said first and second temperature sensing means so that the said standardization member is heated to maintain the adjacent air at substantially the same temperature as the air in said on-sheet air gap.

6. Apparatus for improving the standardization of a backscatter gauge comprising:
   a backscatter gauge to be disposed on-sheet to form an on-sheet air gap and to be disposed at an off-sheet position for standardization,
   means for indicating the output of said gauge and for standardizing said gauge, said standardizing means including a standardization member disposed at said off-sheet position,
   a first thermistor, supported by said gauge and disposed to continuously measure the air temperature in the on-sheet air gap,
   a first thermistor, supported by said gauge and disposed to continuously measure the air temperature in the on sheet- air gap,
   a second thermistor supported adjacent said standardization member to continuously measure the air temperature,
   a Wheatstone bridge, including said first and second thermistors in separate legs, energized between two junctions to provide a first signal across the other two junctions proportional to the difference in resistance of said first and second thermistors, an electric heater thermally coupled to said standardization member, a power supply coupled to said heater through a normally open, relay operated switch, said relay closing said switch when a current passes through the relay coil, said first signal being coupled to said relay coil to close said switch and energize said heater until the temperatures sensed by said first and second thermistors are substantially equal, means coupled to said bridge to prevent said relay from operating when the temperature sensed by said first thermistor is less than the temperature sensed by said second thermistor, and means for preventing said heater from being energized when said gauge is in said standardization position.

7. The apparatus, as described in claim 6, wherein:

said relay operating prevention means is a diode coupled in series with said relay coil to prevent current flowing through said relay coil when said bridge is unbalanced due to the temperature in the on-sheet air gap being less than the temperature adjacent said standardization member.

8. A method of improving the standardization of a nuclear gauge that comprises a source and detector for measuring a property of a sheet material and moves off sheet to standardize with said source, comprising the step of adjusting the air temperature at the off-sheet standardization position during the time the gauge is on-sheet to be substantially equal to the gauge on-sheet air gap temperature.

9. The method, as described in claim 8, wherein heat is supplied to the air at the off-sheet standardization position to substantially equalize the on-sheet air gap and off-sheet standardization position air temperatures.

10. A method of improving the off-sheet standardization of a nuclear gauge that comprises a source and detector for measuring a property of a sheet material and moves off sheet to standardize with said source, comprising the steps of:

adjusting the temperature of the air adjacent the off-sheet standardization position, while the gauge is on sheet and measuring, to substantially equal the air temperature in the on-sheet gauge air gap, moving said gauge to the standardization position, and standardizing said gauge.

11. A method of improving the standardization of a backscatter gauge that comprises a source and detector for measuring a property of a sheet material and moves off sheet to standardize with said source, comprising the step of adjusting the air temperature adjacent the off-sheet standardization member to be substantially equal to the gauge on-sheet air gap temperature before standardization of the gauge, by applying sufficient heat to said standardization member.

References Cited

UNITED STATES PATENTS

| | | | |
|---|---|---|---|
| 2,809,638 | 10/1957 | Mollins | 250—83.3 |
| 2,919,351 | 12/1959 | Swift | 250—83.3 |
| 2,951,161 | 8/1960 | Foster et al. | 250—83.3 |
| 3,051,873 | 8/1962 | Jensen | 317—131 |

RALPH G. NILSON, *Primary Examiner.*

S. ELBAUM, *Assistant Examiner.*

UNITED STATES PATENT OFFICE
CERTIFICATE OF CORRECTION

Patent No. 3,334,230　　　　　　　　　Dated August 1, 1967

Inventor(s) M. W. Shaffer

It is certified that error appears in the above-identified patent and that said Letters Patent are hereby corrected as shown below:

Column 4, line 18, "meansures" should read --measures--

Column 5, line 3, "that thermistors" should read --that the thermistors--; line 31 "istripped" should read --is tripped--

Column 6, claim 4, line 40, "stndardizing" should read --standardizing--; claim 6, lines 67 thru 69, delete entirely, beginning with "a first thermister" and ending with "sheet-air gap,"

Signed and sealed this 8th day of June 1971.

(SEAL)
Attest:

EDWARD M. FLETCHER, JR.　　　　　　WILLIAM E. SCHUYLER, JR.
Attesting Officer　　　　　　　　　　Commissioner of Patents